United States Patent
Matthews

(10) Patent No.: US 7,401,188 B2
(45) Date of Patent: Jul. 15, 2008

(54) METHOD, DEVICE, AND SYSTEM TO AVOID FLUSHING THE CONTENTS OF A CACHE BY NOT INSERTING DATA FROM LARGE REQUESTS

(75) Inventor: Jeanna N. Matthews, Massena, NY (US)

(73) Assignee: Intel Corporation, Santa Clara, CA (US)

( * ) Notice: Subject to any disclaimer, the term of this patent is extended or adjusted under 35 U.S.C. 154(b) by 195 days.

(21) Appl. No.: 11/172,051

(22) Filed: Jun. 29, 2005

(65) Prior Publication Data

US 2007/0005889 A1   Jan. 4, 2007

(51) Int. Cl.
*G06F 12/00* (2006.01)

(52) U.S. Cl. .................. 711/138; 711/118; 711/152; 711/170; 711/173

(58) Field of Classification Search ................. 711/138, 711/118, 152, 170, 173
See application file for complete search history.

(56) References Cited

U.S. PATENT DOCUMENTS

| | | | | |
|---|---|---|---|---|
| 5,644,751 | A * | 7/1997 | Burnett | 711/113 |
| 5,689,679 | A * | 11/1997 | Jouppi | 711/122 |
| 7,047,362 | B2 * | 5/2006 | Kim et al. | 711/128 |
| 2003/0182390 | A1 * | 9/2003 | Alam | 709/216 |

* cited by examiner

*Primary Examiner*—Kimberly McLean-Mayo
(74) *Attorney, Agent, or Firm*—Derek J. Reynolds; Intel Corporation

(57) ABSTRACT

A method, device, and system are disclosed. In one embodiment, the method comprises setting a threshold length for data allowed in a cache, inserting data into the cache during a read or a write request if the length of the data requested is less than the threshold length, and not inserting data into the cache during a read or write request if the length of the data requested is greater than or equal to the threshold length.

15 Claims, 4 Drawing Sheets

METHOD, DEVICE, AND SYSTEM TO AVOID FLUSHING THE CONTENTS OF A CACHE BY NOT INSERTING DATA FROM LARGE REQUESTS

FIELD OF THE INVENTION

The invention relates to caches. More specifically, the invention relates to not inserting data from large requests into a cache to avoid flushing the contents of the cache.

BACKGROUND OF THE INVENTION

Mass storage devices within computers are essential for holding important information for each end user as well as for holding application data and low level operating system files. Although these devices have improved significantly over the years they still are one of the slowest devices in the system when accessing data. The processor and main system memory are much faster at transferring data. To increase the performance of these mass storage devices relative to the other computer system components it is quite common to have a cache associated with the device that stores information recently accessed through read and write commands. Many times a cache is beneficial to increasing the performance of the device, but depending on the location of the data on the mass storage device and the data access patterns, the cache many times is utilized inefficiently.

Caches are most useful for workloads that have a large number of data accesses to a small subset of total data. Additionally, caches are also more efficient if they are able to accumulate historical data about what data is most likely to be reused. When using a disk cache, whether comprised of volatile or non-volatile memory, it is important to consider the impact of workloads that can flush the cache of useful contents. Problematic workloads can include workloads that access a large amount of data only one time such that they displace the useful contents of the cache while deriving no benefit from caching themselves. One such potentially problematic workload is a streaming workload (e.g., video or audio playback).

In a streaming workload, a dataset that is larger than the cache size is accessed sequentially. In this case, even if the access pattern is repeated, the cache is not helpful because the first part of the stream will be evicted by the last part of the stream. Thus, even though the data is inserted in the cache, it is no longer present in the cache by the time it is accessed again. Modern operating systems such as Microsoft® Windows® may have certain disk caching policies for performance improvement based on file types. Thus, a large movie file may not be cached during a stream because the content is played one time only.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of a method, device, and system to avoid flushing the contents of a cache by not inserting data from large requests are disclosed. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
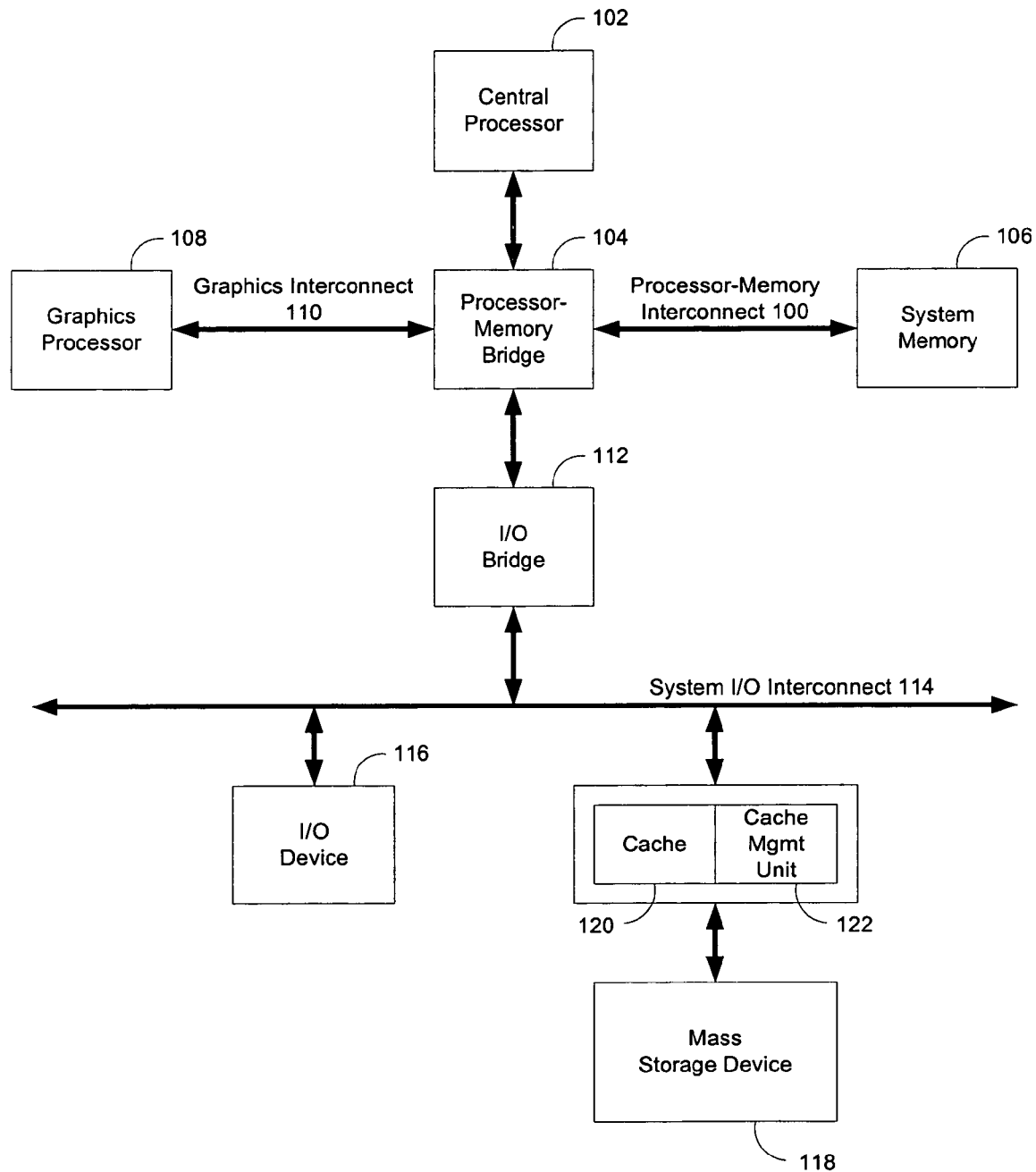
FIG. 1 is a block diagram of a computer system which may be used with embodiments of the present invention.

FIG. 1 is a block diagram of a computer system which may be used with embodiments of the present invention. The computer system comprises a processor-memory interconnect 100 for communication between different agents coupled to interconnect 100, such as processors, bridges, memory devices, etc. Processor-memory interconnect 100 includes specific interconnect lines that send arbitration, address, data, and control information (not shown). In one embodiment, central processor 102 is coupled to processor-memory interconnect 100 through processor-memory bridge 104. In another embodiment, there are multiple central processors coupled to processor-memory interconnect (multiple processors are not shown in this figure).

Processor-memory interconnect 100 provides the central processor 102 and other devices access to the memory subsystem. In one embodiment, a system memory controller that controls access to system memory 106 is located on the same chip as processor-memory bridge 104. In another embodiment, a system memory controller is located on the same chip as central processor 102. Information, instructions, and other data may be stored in system memory 106 for use by central processor 102 as well as many other potential devices. In one embodiment, a graphics processor 108 is coupled to processor-memory bridge 104 through a graphics interconnect 110.

I/O devices, such as I/O device 116, are coupled to system I/O interconnect 114 and to processor-memory interconnect 100 through I/O bridge 112 and processor-memory bridge 104. I/O Bridge 112 is coupled to processor-memory interconnect 100 (through processor-memory bridge 104) and system I/O interconnect 114 to provide an interface for a device on one interconnect to communicate with a device on the other interconnect.

Figure 2:
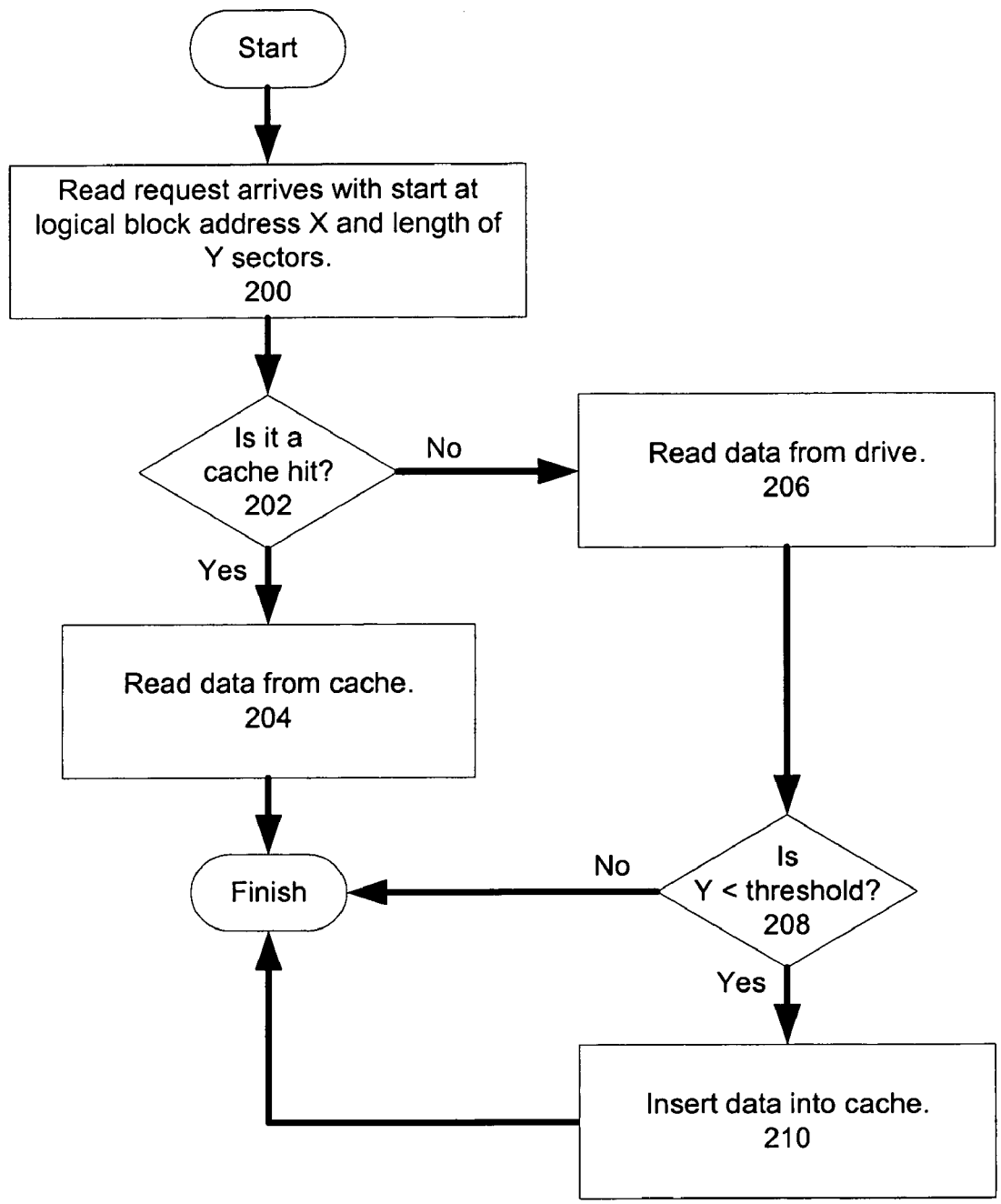
FIG. 2 is a flow diagram of one embodiment of a method to limit the data entering a mass storage drive cache to below a threshold length for a read request.
Figure 3:
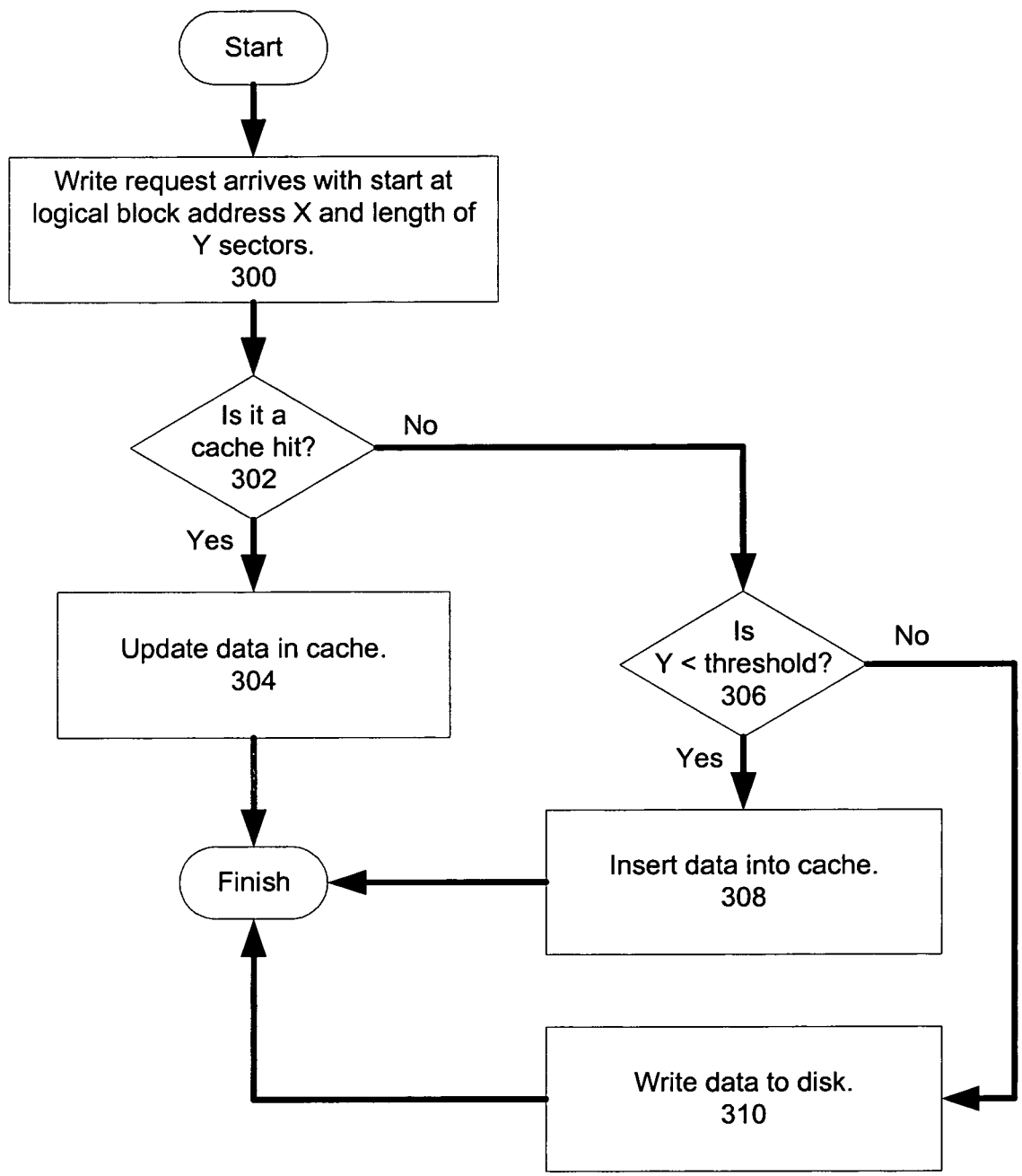
FIG. 3 is a flow diagram of one embodiment of a method to limit the data entering a mass storage drive cache to below a threshold length for a write request.

In one embodiment, mass storage device 118 is coupled to system I/O interconnect 114. In one embodiment, mass storage device is a hard disk drive used to store large quantities of information. In one embodiment, mass storage device includes a cache 120 and a cache management unit 122 designed to more efficiently transfer data from the mass storage device to the rest of the computer system in FIG. 1. In different embodiments, the cache 120 may have volatile or non-volatile memory. The cache management unit 122 includes processing logic to effectively manage the cache 120. In one embodiment, the cache management unit 122 includes a cache threshold unit that limits data entering the cache 120 to data with lengths less than a threshold length. In one embodiment, the cache management unit 122 also includes a data insertion unit that inserts data into the cache when the cache threshold unit determines that the data is cacheable. Thus, if a request was made from the processor to read data to or write data from the mass storage device 118 and the request was for an amount of data greater than or equal to the threshold length, the mass storage device 118 would be directly accessed, bypassing the cache 120. FIG. 2 and FIG. 3 describe this process taking place during a read and write request in greater detail.

FIG. 2 is a flow diagram of one embodiment of a method to limit the data entering a mass storage drive cache to below a threshold length for a read request. The method is performed by processing logic that may comprise hardware (circuitry, dedicated logic, etc.), software (such as is run on a general purpose computer system or a dedicated machine), or a combination of both. In one embodiment, this processing logic is located within the cache management unit (122 in FIG. 1). Referring to FIG. 2, the method begins when a read request arrives with a starting location at logical block address X (where X can be any valid logical block address for a mass storage device) with a length of Y sectors (where Y can be from one to a high value) (processing block 200). Next, processing logic determines whether the read request is a cache hit (i.e., whether the data requested to be read currently resides in the cache) (processing block 202). If the read request is a cache hit, then processing logic reads the data from the cache (processing block 204) and the method is finished.

Otherwise, if the read request is not a cache hit, processing logic reads the data directly from the mass storage drive (processing block 206). Then, processing logic determines whether the requested data length Y is less than a threshold length (processing block 208). If the requested data length Y is not below a threshold length then the method is finished. If the requested data length Y is below a threshold length then processing logic inserts the data into the cache (processing logic 210) and the method is finished.

FIG. 3 is a flow diagram of one embodiment of a method to limit the data entering a mass storage drive cache to below a threshold length for a write request. The method is performed by processing logic that may comprise hardware (circuitry, dedicated logic, etc.), software (such as is run on a general purpose computer system or a dedicated machine), or a combination of both. In one embodiment, this processing logic is located within the cache management unit (122 in FIG. 1). Referring to FIG. 3, the method begins when a write request arrives with a starting location at logical block address X (where X can be any valid logical block address for a mass storage device) with a length of Y sectors (where Y can be from one to a high value) (processing block 300). Next, processing logic determines whether the write request is a cache hit (i.e., whether the data requested to be read currently resides in the cache) (processing block 302). If the write request is a cache hit, then processing logic updates the data in the cache (processing block 304) and the method is finished.

Otherwise, if the write request is not a cache hit, processing logic determines whether the requested data length Y is less than a threshold length (processing block 306). If the requested data length Y is below a threshold length then processing logic inserts the data into the cache (processing logic 308) and the method is finished. If the requested data length Y is not below a threshold length then processing logic writes the data to the mass storage drive (processing logic 310) and the method is finished.

In the above embodiments in FIGS. 2 and 3, the threshold length is the key number used to determine which data requests are cached and which ones are not. Thus, it is important to determine a threshold length that makes efficient use of the cache. In one embodiment, the threshold length is predetermined and set prior to the usage of the mass storage drive. In another embodiment, the threshold length is dynamically changed during drive operation to maintain an efficient cache through multiple changing workloads (i.e., running different computer applications, operating system maintenance functions, etc.). Information relating to the current and recent access requests of the mass storage drive is needed to effectively change the threshold length dynamically. Thus, it is important to track the hit rate of information that is stored in the cache as well as information that does not get stored in the cache because its length is greater than or equal to the threshold length.

Figure 4:
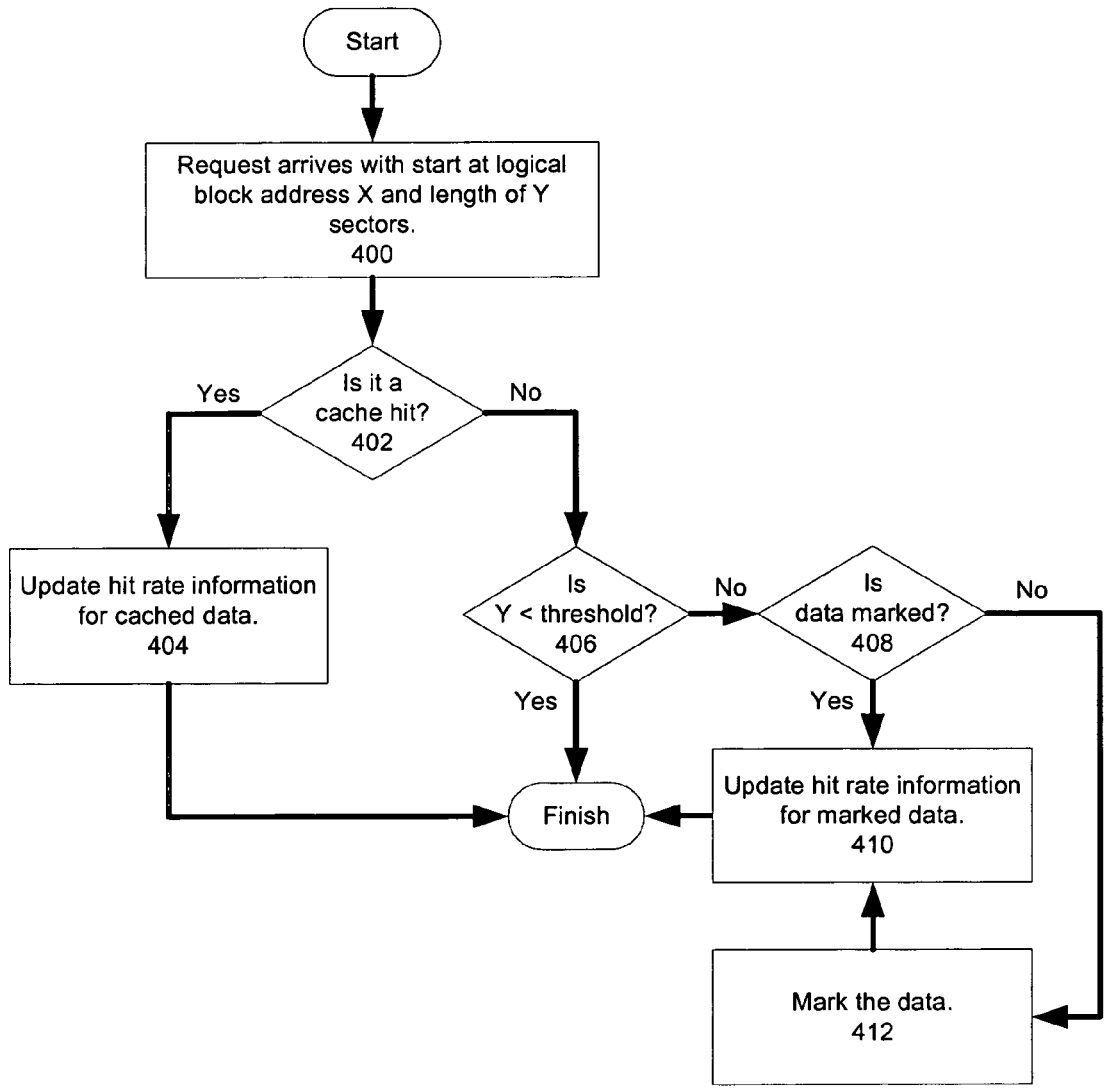
FIG. 4 is a flow diagram of one embodiment of a method to track the cache hit rates of mass storage device data requests.

FIG. 4 is a flow diagram of one embodiment of a method to track the cache hit rates of mass storage device data requests. The method is performed by processing logic that may comprise hardware (circuitry, dedicated logic, etc.), software (such as is run on a general purpose computer system or a dedicated machine), or a combination of both. In one embodiment, this processing logic is located within the cache management unit (122 in FIG. 1). Referring to FIG. 4, the method begins when a request arrives with a starting location at logical block address X (where X can be any valid logical block address for a mass storage device) with a length of Y sectors (where Y can be from one to a high value) (processing block 400).

Next, processing logic determines whether the read or write request is a cache hit (i.e., whether the data requested to be read currently resides in the cache) (processing block 402). If the write request is a cache hit, then processing logic updates the hit rate information for the cached data (processing block 404) and the method is finished. In one embodiment, the hit rate information is tracked on an individual block by block basis. In this embodiment, each piece of information stored within the cache is tracked for its individual hit rate. Thus, the hit rate for a piece of information stored within the cache can be tracked by the absolute number of hits or by an average hit rate tracked over a period of time. In another embodiment, the average hit rate for all information stored within the cache is tracked. The hit rate information tracked in this embodiment is not as specific but it does create less overhead.

Returning to FIG. 4, if the request is not a cache hit then processing logic determines whether the requested data length Y is less than a threshold length (processing block 406). If the requested data length Y is below a threshold length then the method is finished. If the requested data length Y is not below a threshold length then processing logic looks to see if the data is marked (processing block 408). In order to track the hit rate information of data not stored within the cache, the data can be marked with information that allows for tracking its individual hit rate. The marking may be one of many pieces of information in different embodiments. In one embodiment, the mark is a unique ID for each piece of accessed information. Again, returning to FIG. 4, if the data is marked, then processing logic updates the hit rate information for that piece of marked data (processing block 410) and the method is finished. Otherwise, if the data is not marked, then processing logic marks the data with the tracking ID (processing block 412) and then updates the hit rate information for the marked data (processing block 410) and the method is finished.

The threshold length can be dynamically changed in one embodiment. For example, in one embodiment, the threshold length changes based on how full the cache is. When the cache is mostly empty, all data is inserted. When the cache begins to fill up, the threshold length is progressively lowered.

Furthermore, in another embodiment, if at any time the threshold length is high and data from large requests are inserted in the cache, the large request data can be specially marked so that the hit rate to such data can be tracked. In different embodiments, tracking data from large requests can be done over a window of time or by the number of requests. The value of the data can be determined based on the hit rate information. In one embodiment, if the average hit rate to such data is high there is a high value of the data. Thus, the threshold length is then set above the length of the data with the high average hit rate. Alternatively, if the average hit rate to such data is low, in one embodiment, the threshold length is reduced.

In another embodiment, a portion of the cache allows storage of higher length data (i.e., no threshold length limit) and the threshold length only limits data from entering the remaining portion of the cache. This embodiment limits the impact of cache performance when the system switches to a workload where inserting data from large requests is more beneficial.

The threshold length can be effectively changed dynamically with tracking information on hit rates for both data that reside within the cache as well as data rejected from being read from or written to the cache (i.e., the marked data referred to in FIG. 4). In one embodiment, the average hit rate for all the data in the cache can be calculated and compared against the average hit rate for all data requests whose lengths are a certain amount above the threshold. For example, in one embodiment, the average hit rate of all cached data is compared against the average hit rate of data with lengths greater than or equal to 50% above the threshold length. In this example embodiment, if the average hit rate of the data with lengths 50% more than the threshold length is significant compared to the hit rate of cached data, then the threshold length is increased.

In another embodiment, the average hit rate of cached data is compared against the average hit rate of all data greater than or equal to the threshold length. In this embodiment, the data from requests with lengths greater than or equal to the threshold length are marked with a separate identifier flag. The separate flag allows the cache management unit to identify data to be tracked that are above a certain length. In one embodiment, the cache management unit dynamically monitors the non-cacheable marked data and the data within the cache to determine if any particular piece of marked data has a high enough hit rate. In one embodiment, if the hit rate for marked data (data with lengths greater than or equal to the threshold length) is high enough, the cache management unit will increase the threshold length. In this embodiment, if the cache management unit observes through monitoring data that a high number of data accesses take place involving data longer than the threshold length, the cache management unit will increase the threshold length to allow for larger pieces of data to access the cache. In this embodiment, the cache management unit monitors the data as mentioned above to determine whether the threshold should increase. If the data accesses involving data longer than the threshold length are greater than a certain percentage of the total number of data accesses, then the cache management unit increases the threshold length. By increasing the threshold length, the cache management unit increases the total potential amount of data that can be cached.

In another embodiment, the same process is utilized to decrease the threshold length. If the average hit rate of data with lengths greater than or equal to the threshold length is low enough, the cache management unit lowers the threshold length by a certain percentage.

In another embodiment, the threshold length for read requests could be different than the threshold length for write requests. In this embodiment, the entire process of determining and setting an effective threshold length as well as the dynamic threshold policies is done entirely separately for read requests and for write requests.

Thus, embodiments of a method, device, and system to avoid flushing the contents of a cache by not inserting data from large requests have been disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
setting a threshold length for data allowed in a cache;
inserting data into the cache during a read or a write request if the length of the data requested is less than the threshold length;
not inserting data into the cache during a read or write request if the length of the data requested is greater than or equal to the threshold length;
monitoring the average hit rate of the non-cached data that is greater than or equal to the threshold length; and
dynamically changing the threshold length based on the monitoring results.

2. The method of claim 1, further comprising limiting data inserted into the cache to under a certain length to just a portion of the cache, the portion having a size less than the entire cache.

3. The method of claim 1, further comprising:
not inserting data into the cache during a write request if the length of the data requested is less than the threshold length; and
inserting data into the cache during any read request.

4. The method of claim 1, further comprising:
not inserting data into the cache during a read request if the length of the data requested is less than the threshold length; and
inserting data into the cache during any write request.

5. A device, comprising:
a data insertion unit to;
insert data into the cache during a read or a write request if the length of the data requested is less than a threshold length.
not insert data into the cache during a read or write request if the length of the data requested is greater than or equal to the threshold length; and
a cache threshold unit to set the threshold length for data allowed in a cache;
monitor the average hit rate of the non-cached data that is greater than or equal to the threshold length; and
dynamically change the threshold length based on the monitoring results.

6. The device of claim 5, wherein the cache threshold unit is further operable to limit the data inserted into the cache to under a certain length to just a portion of the cache, the portion having a size less than the entire cache.

7. The device of claim 5, wherein the cache threshold unit is further operable to:
increase the threshold length if the average hit rate of the non-cached data is greater than a pre-determined percentage of total data requests; and
decrease the threshold length if the average hit rate of the non-cached data is less than a pre-determined percentage of total data requests.

8. The device of claim 5, wherein the data insertion unit is further operable to:
- not insert data into the cache during a write request if the length of the data requested is less than the threshold length; and
- insert data into the cache during any read request.

9. The device of claim 5, wherein the data insertion unit is further operable to:
- not insert data into the cache during a read request if the length of the data requested is less than the threshold length; and
- insert data into the cache during any write request.

10. The method of claim 9, wherein dynamically changing the threshold length based on the results of the examination further comprises increasing the threshold length if the average hit rate of the non-cached data is greater than a pre-determined percentage of total data requests; and
- decreasing the threshold length if the average hit rate of the non-cached data is less than a pre-determined percentage of total data requests.

11. A system, comprising:
- a bus;
- a processor coupled to the bus; and
- a mass storage device coupled to the bus, the mass storage device further comprising:
  - a cache; and
  - a cache management unit to:
    - set a threshold length for data allowed in the cache;
    - insert data into the cache during a read or a write request if the length of the data requested is less than the threshold length;
    - not insert data into the cache during a read or write request if the length of the data requested is greater than or equal the threshold length;
    - monitor the average hit rate of the non-cached data that is greater than or equal to the threshold length; and
    - dynamically change the threshold length based on the monitoring results.

12. The system of claim 11, wherein the cache management unit is further operable to limit the data inserted into the cache to under a certain length to just a portion of the cache, the portion having a size less than the entire cache.

13. The system of claim 11, wherein the cache management unit is further operable to:
- not insert data into the cache during a write request if the length of the data requested is less than the threshold length; and
- insert data into the cache during any read request.

14. The system of claim 11, wherein the cache management unit is further operable to:
- not insert data into the cache during a read request if the length of the data requested is less than the threshold length; and
- insert data into the cache during any write request.

15. The system of claim 11, wherein the cache management unit is further operable to:
- increase the threshold length if the average hit rate of the non-cached data is greater than a pre-determined percentage of total data requests; and
- decrease the threshold length if the average hit rate of the non-cached data is less than a pre-determined percentage of total data requests.

* * * * *